Feb. 22, 1944. R. J. MILLER 2,342,208
TORQUE CONVERTER
Filed Sept. 19, 1940
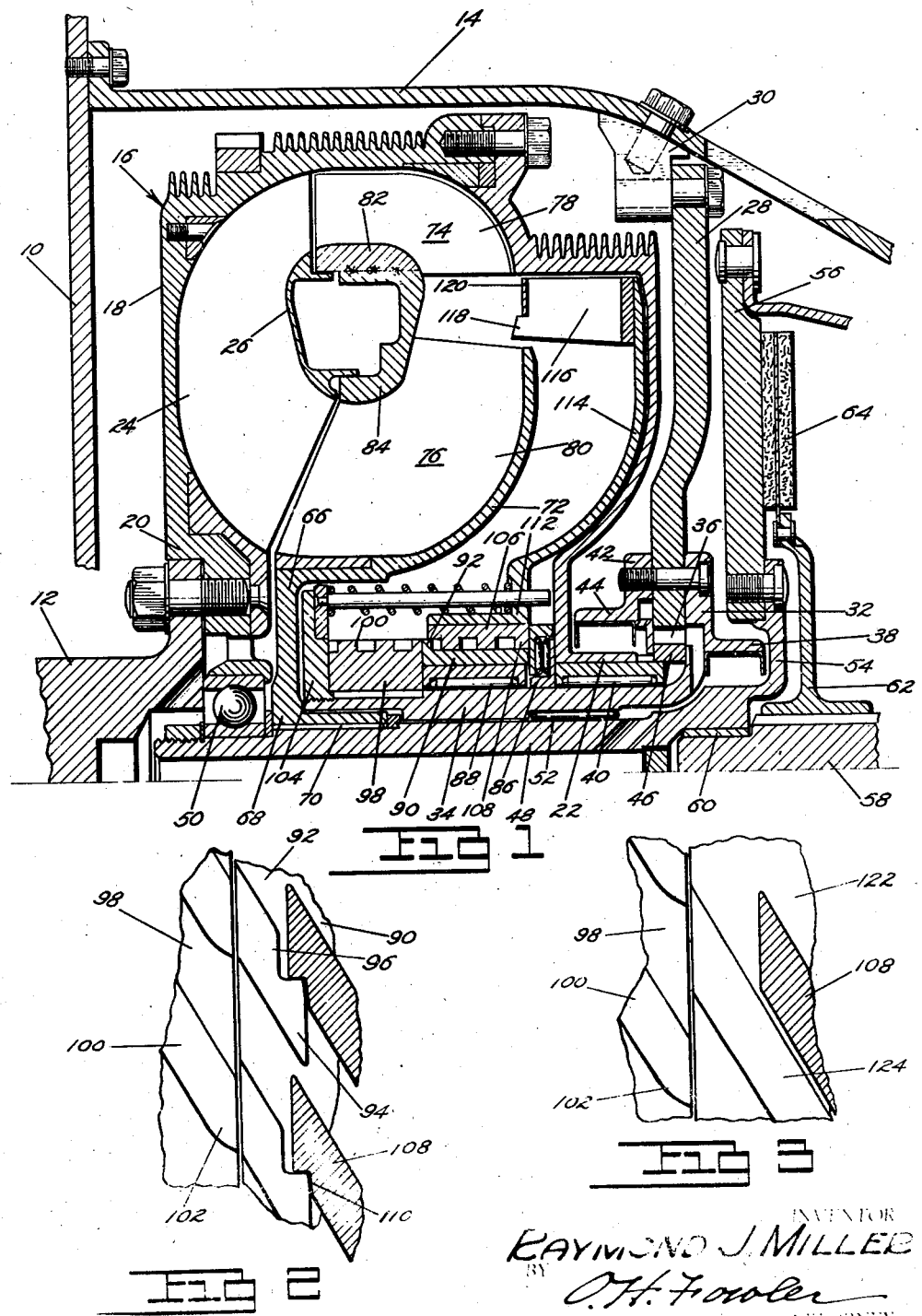
INVENTOR
RAYMOND J MILLER
BY
O. H. Fowler
ATTORNEY Patented Feb. 22, 1944

2,342,208

UNITED STATES PATENT OFFICE 2,342,208

TORQUE CONVERTER

Raymond J. Miller, Detroit, Mich., assignor to Hydraulic Brake Company, Detroit, Mich., a corporation of California Application September 19, 1940, Serial No. 357,493

7 Claims. (Cl. 60—54)

This invention relates to torque converters, and more particularly to means for control of the reaction member thereof.

Broadly the invention comprehends means insuring positive actuation of the reaction member of a torque converter.

An object of the invention is to provide positive means for moving the reaction member into and out of the fluid circuit of the converter, including means for retaining the member against rotation in one direction when in the circuit and for rotation of the member when retracted from the circuit.

Other objects and advantages of the invention will appear from the following description taken in connection with the drawing forming a part of this specification, and in which—

Fig. 1 is a sectional view of a torque converter embodying the invention;

Fig. 2 is a diagram illustrating a preferred form of the adjustment screw; and

Fig. 3 is a diagram illustrating a modified form of the adjusting screw.

Referring to the drawing for more specific details of the invention, 10 represents the crank-case of an internal combustion engine, and 12 the crank-shaft of the engine. The crank-case has suitably secured thereto a bell housing 14 enclosing a torque converter indicated generally at 16. The torque converter includes a housing 18 having a hub 20 bolted or otherwise secured to the crank-shaft 12 and an oppositely disposed hub 22. The housing 18 has a plurality of impeller blades 24 arranged on the inner wall thereof, and a shroud 26 is secured to the blades.

A bracket 28 secured to the wall of the bell housing 14 as by suitable fittings 30 has secured on one side thereof a ring 32 supporting a hollow spindle 34 extended concentrically through an opening 36 in the bracket and through the hub 22 into the housing 18, also a laterally extended flange 38, and a needle bearing 40 is fitted between the hub 22 and the spindle 34. A ring 42 secured to the bracket in oppositely disposed relation to the ring 32 has a flange 44 overhanging the hub 22. A fluid pump 46 of any suitable structure preferably of the gear type is mounted in the opening 36 in the bracket between the rings 32 and 42 and is driven by the housing 18, and suitable packing is supported by the flanges 38 and 44 for inhibiting seepage of fluid.

A center-shaft 48 supported for rotation on a ball bearing 50 in the hub 20 of the housing and on a needle bearing 52 in the hollow spindle 34 has a circumferential flange 54 supporting a clutch member 56, and a driven shaft 58 journaled in a bushing 60 in the flange 54 in axial alignment with the center-shaft 48 has splined thereon a collar 62 carrying a clutch member 64 for cooperation with the clutch member 56. The clutch may be of any suitable type, operative in conventional manner.

A turbine 66 has a hub 68 secured to the center-shaft 48 as by a spline 70 and a rim 72 within the housing 18 having thereon a two-stage turbine 74 and 76 including blades 78 and 80 having secured thereto shrouds 82 and 84 suitably secured to one another.

A parallel brake 86 is sleeved on and fixedly secured to the spindle 34 in abutting relation to the hub 22 of the housing 18. This brake includes two rings having reversely disposed flanges and a coil spring interposed between the flanges. Other types of expansible elements may be employed with satisfactory results. A needle bearing 88 also sleeved on the spindle 34 supports for rotation a sleeve 90 engaged by the brake 86, and the sleeve has a flange 92 provided with threads 94 having dogs 96.

A heavy sleeve 98 is splined on the spindle 34 in abutting relation to the bearing 88 and also the sleeve 90. This heavy sleeve 98 has threads 100 corresponding in pitch to the pitch of the threads 94 and adapted to register therewith. The approaches of the threads 100 are rounded, as indicated at 102, to provide enlarged entrances, the purpose of which will hereinafter appear, and a collar 104 threaded on the end of the spindle serves to retain the assembly against displacement.

A carrier 106 mounted for rotation on the sleeve 90, and also for travel longitudinally, has threads 108 for cooperation with the threads 94 on the sleeve 90 and also the threads 100 on the sleeve 98, and the leading ends of the threads 108 are provided with dogs 110 for cooperation with the dogs 96 on the threads 94 on the sleeve 90.

The carrier 106 has secured thereto a collar 112 supporting a web 114 within the housing 18. A plurality of reaction vanes 116 are arranged on the web, and each of these vanes has a tab 118, and a shroud 120 is suitably secured to the vanes.

A modification of the engagement screw is illustrated in Fig. 3. In this embodiment a sleeve 122 has threads 124 corresponding to the threads 94 on the sleeve 90. The threads 124 are continued throughout the length of the sleeve 122 and the dogs are omitted.

In both the preferred and modified forms of the engagement screw, the ratio of the threads 100 on the sleeve 98 to the threads 94 or the threads 124 may be in any multiple desired.

As illustrated, the elements of the unit are in position for the unit to function as a fluid coupling. In a normal operation, fluid is delivered from the outlet of the pump 46 through the hollow shaft 48 to the impeller blades 24 and returns from the housing 18 to the pump as by an inlet, not shown. The blades of the impeller impart motion to the fluid, resulting in the fluid being carried to the wall of the housing 18 where the fluid impinges on the blades 78 of the first stage 74 of the turbine, transmitting a part of its motion thereto.

The fluid is then conveyed by the trailing edges of the vanes 78 of the first stage 74 of the turbine to the entrance edges of the blades 80 of the second stage 76 of the turbine, imparting the remainder of its motion thereto, thence to the blades 24 of the impeller to complete the cycle.

When torque is required, the direction of fluid flow in the housing is such that the fluid impinging on the tabs 118, results in first slowing the reaction member 114 down until it stops, whereupon the pressure of the fluid starts to rotate the member in the opposite direction. The brake 86 slightly restrains the member 90 against rotation, and this results in relative rotation between the sleeve 90 and the carrier 106, causing the dogs 110 to disengage from the dogs 96, and the threads 108 to move forward in their respective grooves in the flange 92. At this instant, as the reaction member continues to rotate in its new direction of rotation, the threads 108 enter the threads 100 assisted by the curved approaches 102 and the enlarged entrances. The reaction member continues to move forward on the engagement screw, bringing into the fluid flow the reaction vanes 116. This movement is restrained by a unit including a plurality of springs, preferably arranged in pairs around the axis of the turbo between the head of the engagement screw and the reaction member.

Upon attaining a predetermined speed, wherein torque multiplication is no longer required, the direction of the fluid flow changes and the fluid impinges on the backs of the reaction vanes 16. This results in automatic movement of the reaction member 114 on the threads 100 of the stationary sleeve 98 and on the threads 94 on the flange 92 of the sleeve 90 frictionally restrained against movement by the brake 86.

As the reaction member travels on the threaded portions of the sleeves, the reaction vanes 116 move out of the fluid circuit, and when the reaction member has assumed its fully retracted position, the dogs 96 on the threads 94 are engaged by the dogs 110 on the threads 108. Thereafter the reaction member 114 and the sleeve 90 rotate as a single unit subject to the slight frictional resistance presented by the brake 86. This completes the cycle, and the apparatus again functions as a fluid coupling.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A torque converter comprising an impeller, a turbine for cooperation therewith, a retractable reaction member associated with the turbine and means for moving the member including relatively rotatable co-axial threaded members, a carrier for the reaction member mounted for threaded travel on the threaded members, and means for interlocking the carrier with the rotatable threaded member when the reaction member is in retracted position.

2. A torque converter comprising an impeller, a turbine for cooperation therewith, a reaction member associated with the turbine, means for moving the reaction member into and out of fluid flow including a fixed threaded member, a rotatable threaded member associated therewith, a carrier for the reaction member mounted for threaded travel on the threaded members, and means for resisting movement of the rotatable threaded member.

3. A torque converter comprising an impeller, a turbine for cooperation therewith, a reaction member associated with the turbine, means for moving the reaction member into and out of fluid flow including a fixed threaded member, a rotatable threaded member in axial alignment with the fixed threaded member, a carrier for the reaction member mounted for threaded travel on the threaded members, and means for slightly resisting movement of the rotatable threaded member.

4. A torque converter comprising an impeller, a turbine providing in conjunction therewith a fluid circuit, a fixed threaded member, a rotatable threaded member in axial alignment with the fixed threaded member, a carrier mounted for threaded travel on the fixed and rotatable members, a reaction member on the carrier adapted to move into and out of the circuit, a yielding element between the fixed member and the carrier, and means for frictionally resisting movement of the rotatable member.

5. A torque converter comprising an impeller and a turbine providing in conjunction with one another a fluid circuit, a fixed threaded member, guide means at the entrances of the threads, a rotatable member arranged end to end in axial alignment with the fixed member having threads corresponding in pitch to the threads on the fixed member, a carrier mounted for threaded travel on the threaded members, a reaction member supported on the carrier adapted to be moved by the carrier into and out of the fluid circuit, means yieldingly opposing movement of the reaction member into the fluid circuit, and means imposing slight resistance to movement of the rotatable member.

6. A torque converter comprising an impeller and a turbine providing in conjunction with one another a fluid circuit, a fixed threaded member, a rotatable threaded member associated therewith, dogs on the rotatable member, a carrier mounted for travel on the fixed and rotatable members, dogs on the carrier for cooperation with the dogs on the rotatable member, a reaction member on the carrier movable into and out of the fluid circuit, means for progressively opposing movement of the reaction member into the fluid circuit, and means for resisting rotation of the rotatable threaded member.

7. A torque converter comprising an impeller a two-stage turbine providing in conjunction therewith a fluid circuit, a fixed threaded member supported concentrically of the impeller and turbine, guide means on the approaches of the threads of the threaded member, a rotatable threaded member aligned with the fixed member, dogs on the threads of the rotatable member, a carrier having threads complementary to the threads on the fixed and rotatable members for travel of the carrier on the members, dogs on the threads of the carrier for cooperation with the dogs on the threads of the rotatable member, a reaction member on the carrier adapted to move into and out of the circuit, means progressively opposing the reaction member as it moves into the circuit, and a brake resisting rotation of the rotatable threaded member.

RAYMOND J. MILLER.